(12) United States Patent
Messina (10) Patent No.: US 8,987,637 B1
(45) Date of Patent: Mar. 24, 2015

(54) WELDING TORCH OSCILLATOR WITH MOTORIZED PITCH CONTROL

(75) Inventor: Ryan Messina, Denver, CO (US)

(73) Assignee: The Reliable Automatic Sprinkler Co, Inc., Liberty, SC (US)

( * ) Notice: Subject to any disclaimer, the term of this patent is extended or adjusted under 35 U.S.C. 154(b) by 532 days.

(21) Appl. No.: 13/278,332

(22) Filed: Oct. 21, 2011

Related U.S. Application Data (60) Provisional application No. 61/405,607, filed on Oct. 21, 2010.

(51) Int. Cl.
| | |
|---|---|
| B23K 9/00 | (2006.01) |
| B23K 9/32 | (2006.01) |
| B23K 31/02 | (2006.01) |
| B23K 11/30 | (2006.01) |
| B23K 15/00 | (2006.01) |

(52) U.S. Cl.
USPC ........... 219/136; 219/60 A; 219/61.5; 219/65; 219/121.13

(58) Field of Classification Search
CPC ........ B23K 9/12; B23K 37/02; G05B 19/416; G05B 2219/50353
USPC .................. 219/136, 604–608, 617, 59.1–67, 219/68–69.2, 121.13–121.18, 124.32, 219/124.22, 124.33, 125.1; 901/16, 41, 9
See application file for complete search history.

(56) References Cited

U.S. PATENT DOCUMENTS

| | | | | |
|---|---|---|---|---|
| 2,390,896 A | | 12/1945 | Pelland, Jr. .................... 248/286 |
| 3,555,239 A | * | 1/1971 | Kerth ........................ 219/124.34 |
| 3,844,469 A | | 10/1974 | Westfall ........................... 228/28 |
| 3,903,391 A | | 9/1975 | Nelson et al. .................... 219/60 |
| 3,963,895 A | * | 6/1976 | Hennion .................... 219/125.12 |
| 4,019,016 A | | 4/1977 | Friedman et al. .............. 219/125 |
| 4,118,620 A | | 10/1978 | Wall, Jr. et al. ............... 219/124 |
| 4,188,525 A | * | 2/1980 | Merrick et al. .......... 219/125.12 |
| 4,356,378 A | * | 10/1982 | Cloos et al. ................ 219/124.1 |
| 4,376,886 A | * | 3/1983 | Sciaky et al. ............. 219/121.14 |
| 4,380,695 A | * | 4/1983 | Nelson ..................... 219/125.12 |
| 4,491,718 A | * | 1/1985 | Cook et al. ............... 219/124.22 |
| 4,495,400 A | | 1/1985 | Thompson ..................... 219/125 |

(Continued)

FOREIGN PATENT DOCUMENTS

| | | |
|---|---|---|
| JP | 57-171585 | 10/1982 |
| JP | 57-195583 | 12/1982 |

(Continued)

OTHER PUBLICATIONS

"XMS-OSC Mechanical Weld Oscillator Product Specification" (author(s) unknown), four pages; AMET Inc (two pages dated separately, exact date of whole document unknown, but not later than Jul. 2009).

(Continued)

*Primary Examiner* — Dana Ross
*Assistant Examiner* — Gyounghyun Bae
(74) *Attorney, Agent, or Firm* — Fitzpatrick, Cella, Harper & Scinto (57) ABSTRACT

The welding torch performs oscillation of the torch head while moving the torch head along the circular weld path, under control of signals generated by a controller. The operator of the welding torch preferably has control over the amplitude of the oscillation, how fast it moves back and forth, and how long it remains at each turning point of the oscillation (dwell time).

8 Claims, 7 Drawing Sheets

(56) References Cited

U.S. PATENT DOCUMENTS

| | | | |
|---|---|---|---|
| 4,577,089 A * | 3/1986 | Olson et al. | 219/124.22 |
| 4,577,499 A * | 3/1986 | Silke et al. | 73/865.8 |
| 4,590,577 A * | 5/1986 | Nio et al. | 700/252 |
| 4,629,860 A * | 12/1986 | Lindbom | 219/125.1 |
| 4,841,123 A * | 6/1989 | Novak et al. | 219/125.12 |
| 4,920,248 A * | 4/1990 | Toyoda et al. | 219/124.34 |
| 4,937,427 A * | 6/1990 | McVicker | 219/125.11 |
| 4,986,002 A * | 1/1991 | Oros et al. | 33/354 |
| 5,130,514 A | 7/1992 | Kugai et al. | 219/124 |
| 5,148,000 A | 9/1992 | Tews | 219/125 |
| 5,227,601 A * | 7/1993 | Black | 219/61 |
| 5,534,676 A | 7/1996 | Rinaldi et al. | 219/124 |
| 5,624,588 A * | 4/1997 | Terawaki et al. | 219/124.34 |
| 5,906,761 A * | 5/1999 | Gilliland et al. | 219/124.34 |
| 5,932,123 A | 8/1999 | Marhofer et al. | 219/130 |
| 6,225,599 B1 * | 5/2001 | Altekruse | 219/137.31 |
| 6,230,072 B1 * | 5/2001 | Powell et al. | 700/195 |
| 6,297,472 B1 | 10/2001 | Bong et al. | 219/125 |
| 6,429,405 B2 * | 8/2002 | Belloni et al. | 219/124.34 |
| 6,492,618 B1 | 12/2002 | Flood et al. | 219/125 |
| 6,518,545 B1 * | 2/2003 | Richard et al. | 219/130.21 |
| 6,657,161 B2 | 12/2003 | Marhofer et al. | 219/125 |
| 6,909,066 B2 * | 6/2005 | Zheng et al. | 219/130.5 |
| 6,953,909 B2 | 10/2005 | Marhofer et al. | 219/125 |
| 7,020,942 B2 * | 4/2006 | Siracusa | 29/26 A |
| 7,196,285 B2 * | 3/2007 | Inoue et al. | 219/137.9 |
| 7,429,716 B2 | 9/2008 | Bong et al. | 219/125.1 |
| 7,738,996 B2 * | 6/2010 | Luthardt | 700/245 |
| 2001/0045420 A1 | 11/2001 | Bong et al. | 219/125.1 |
| 2002/0005397 A1 | 1/2002 | Bong et al. | 219/125.1 |
| 2007/0297556 A1 | 12/2007 | Spencer et al. | 376/245 |
| 2008/0053978 A1 | 3/2008 | Peters et al. | 219/130.5 |

FOREIGN PATENT DOCUMENTS

| | | |
|---|---|---|
| JP | 60-250876 | 12/1985 |
| JP | 6-142929 | 5/1994 |

OTHER PUBLICATIONS

"GSK: Gür Kaynak SISTEMLERI" (author(s) unknown); two pages (from www.gkskynak.com; exact date unknown, but not later than Jul. 2009).

* cited by examiner

WELDING TORCH OSCILLATOR WITH MOTORIZED PITCH CONTROL

This application is a non-provisional of Ser. No. 61/405,607 filed Oct. 21, 2010, the entire contents of which are incorporated herein by reference.

The present invention relates generally to welding torches, and more particularly to torch oscillators suitable for use in welding fixtures to pipes or the like.

Various kinds of welding torches designed to assist in accurate, reliable welding of different types of work pieces are known. Whereas a welder using a hand-held torch moves the torch along the weld path manually, motorized torches for making certain shapes of weld paths have been developed, to assist the welder in achieving highly accurate movement of the torch. Some examples of various types of welding apparatuses are shown in U.S. Pat. Nos. 2,390,896; 3,844,469; 3,903,391; 4,019,016; 4,118,620; 4,495,400; 5,130,514; 5,148,000; 5,534,676; 5,932,123; 6,297,472; 6,492,618; 6,657,161; 6,953,909; and 7,429,716. Additional examples are to be found in U.S. Patent Application Publications 2001/0045420; 2002/0005397; 2007/0297556; and 2008/0053978, as well as in the following Japanese laid-open patent applications: JP 57-195583 A; JP 06-142929 A; JP 57-171585 A; and JP 60250876 A. (The entire contents of each of these documents, and of each of the patent documents mentioned below, are incorporated herein by reference; of course, no claim is made to ownership of those documents or of inventions disclosed therein.)

Special designs of motorized torches may be needed, depending on the shapes of the pieces that are to be welded together. For example, if two cylindrical pipes are to be welded together end to end, the weld will follow a circle that goes around the circumference of the pipes. Providing a motorized torch to perform this type of welding presents challenges different from those involved in simply being able to move a torch head along a straight line. For motorized welding along an irregularly curved contour, still more highly specialized machinery is required. One example of a motorized welding torch for such tasks as these is shown in U.S. Pat. No. 4,118,620 (Wall, Jr. et al.; computerized welding system intended to enable a welding torch head to follow arbitrary contours). Others can be found in the patents listed above.

Figure 5:
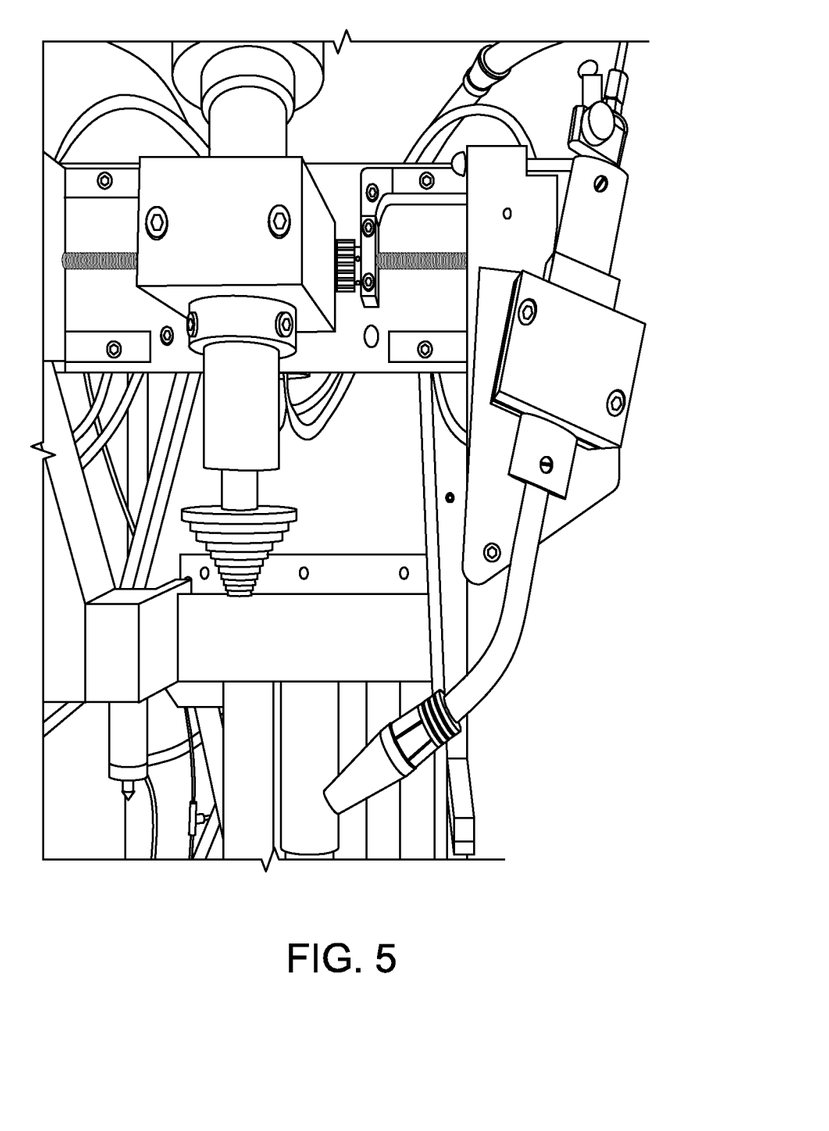
FIG. 5 is a view illustrating the structure of an arc welder to which the present invention can be applied.
Figure 6:
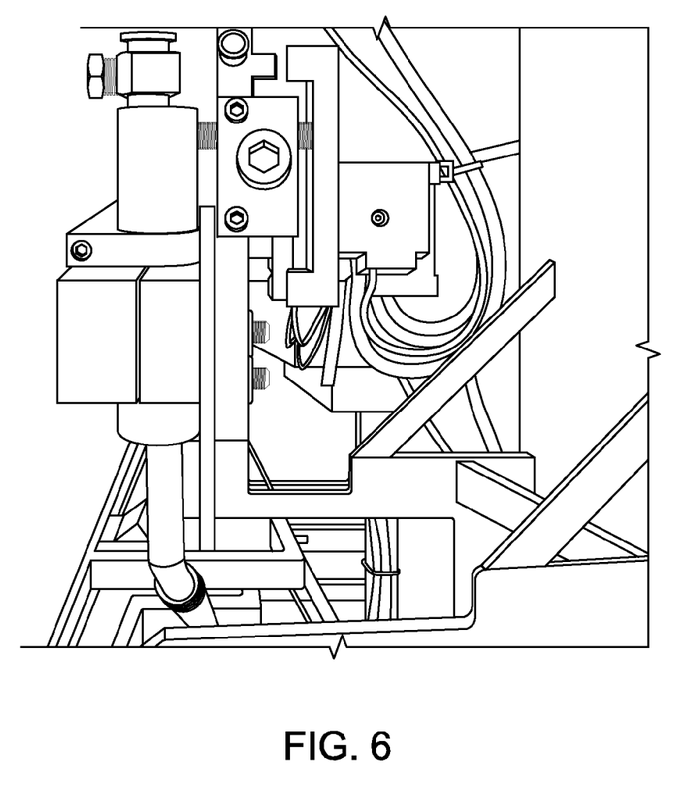
FIG. 6 is a view showing more detail of the structure of the arc welder of FIG. 5.
Figure 7:
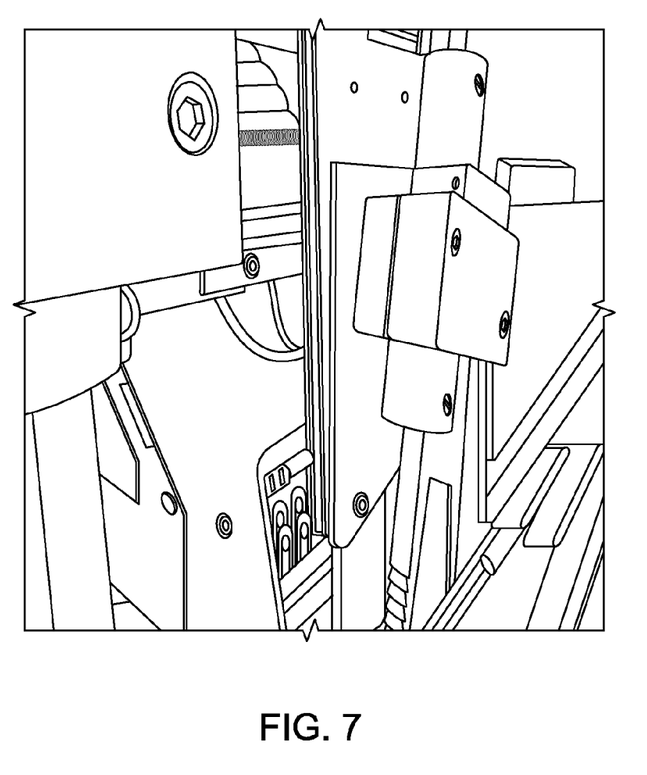
FIG. 7 is a view showing additional detail of the structure of the arc welder of FIG. 5 (the structure illustrated in FIGS. 5-7 may be used in an arc welder according to the invention, but can also be used in a conventional arc welder).

One such kind of welding torch has been developed for use in welding fittings to cylindrical pipes for use in fire-prevention sprinkler systems and the like. To weld a fixture having a disc-shaped base to a pipe or other surface, the line of the weld will follow the circumference of the base of the fixture, and thus will be circular. An example of such a torch is shown in FIGS. 5-7.

Such torches have been developed for making several types of welds, including straight line welds, welds around the circumference of two cylindrical pipes mated end to end, and circular welds of the type first mentioned above, in which a fixture is welded to a lateral surface of a cylindrical pipe.

One welding technique involves the welder moving the torch back and forth (termed "oscillating" it) across the path of the weld, increasing the area that is heated, and producing a wider bead and a stronger weld. It has been possible to provide welding machines of some types with the ability to oscillate the torch back and forth across the width of the weld, as a welder would do in making a weld manually. For example, U.S. Pat. No. 3,844,469 (Westfall) shows an apparatus for oscillating a welding tool by means of a fluid-powered system, to enable the formation of an end-to-end weld joining two lengths of pipe. U.S. Pat. No. 4,019,016 (Friedman et al.) shows an electronic welding control system that moves a welding torch on a carriage along a weld path while oscillating across the path, also to form such an end-to-end weld joining two lengths of pipe. Friedman et al. state that their machine can be used with other shapes of weld paths, such as rectilinear.

While motorized welding with oscillation has been achieved for a number of types of weld paths, it would be desirable also to provide this ability for circular welds of the type needed to secure fire-sprinkler and related fixtures to a pipe or the like.

SUMMARY OF THE INVENTION

The present inventor discloses herein a welding torch that can move the torch head to make a circle weld such as is required in welding a fire prevention sprinkler fixture to a pipe, while performing oscillation of the torch head.

DETAILED DESCRIPTION OF THE PREFERRED EMBODIMENT

Figure 1:
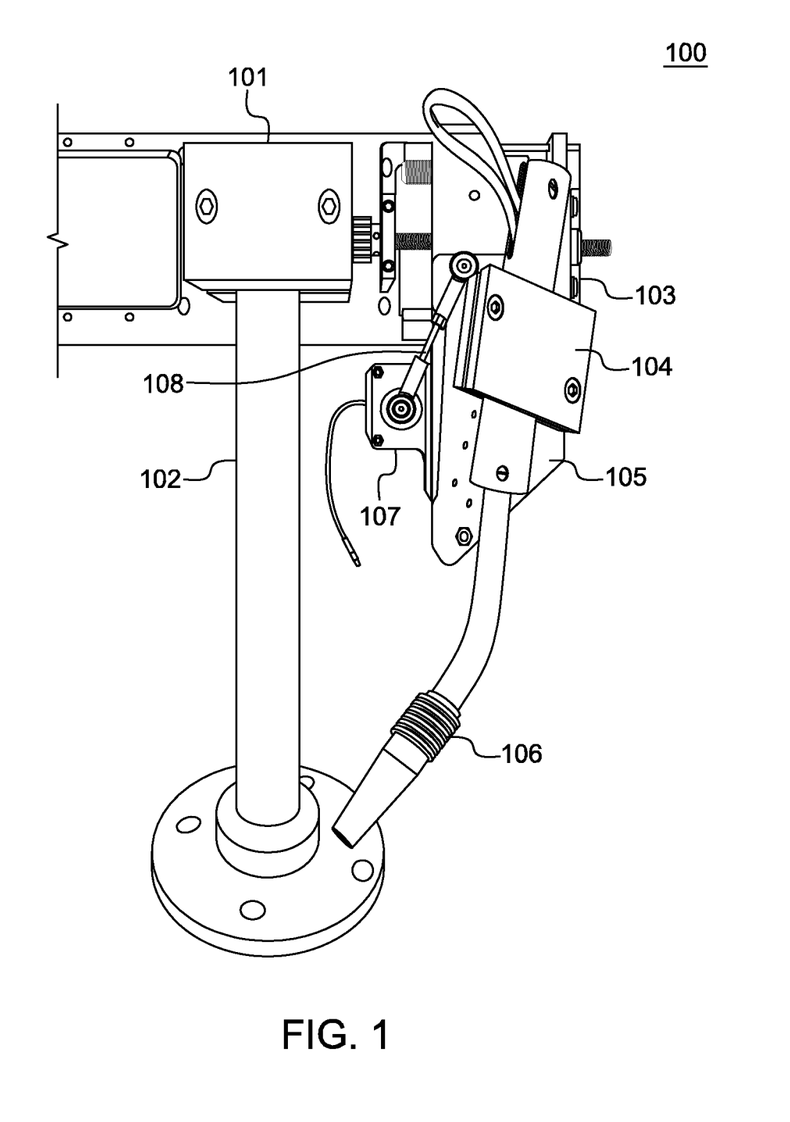
FIG. 1 is a view illustrating the structure of an arc welder according to one preferred embodiment of the invention.
Figure 2:
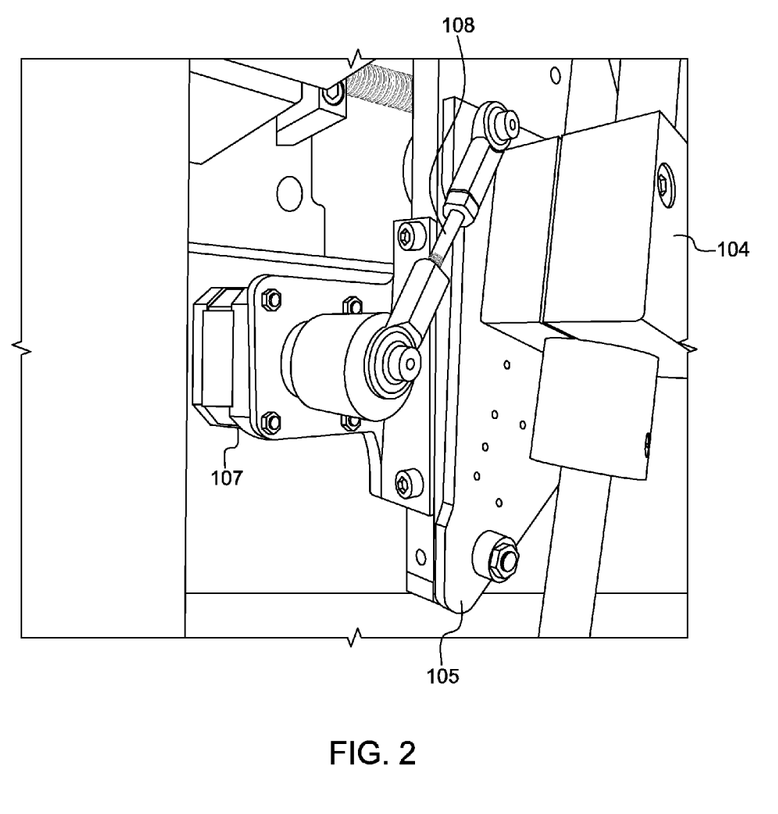
FIG. 2 is a view showing more detail of the structure of the arc welder of FIG. 1.
Figure 3:
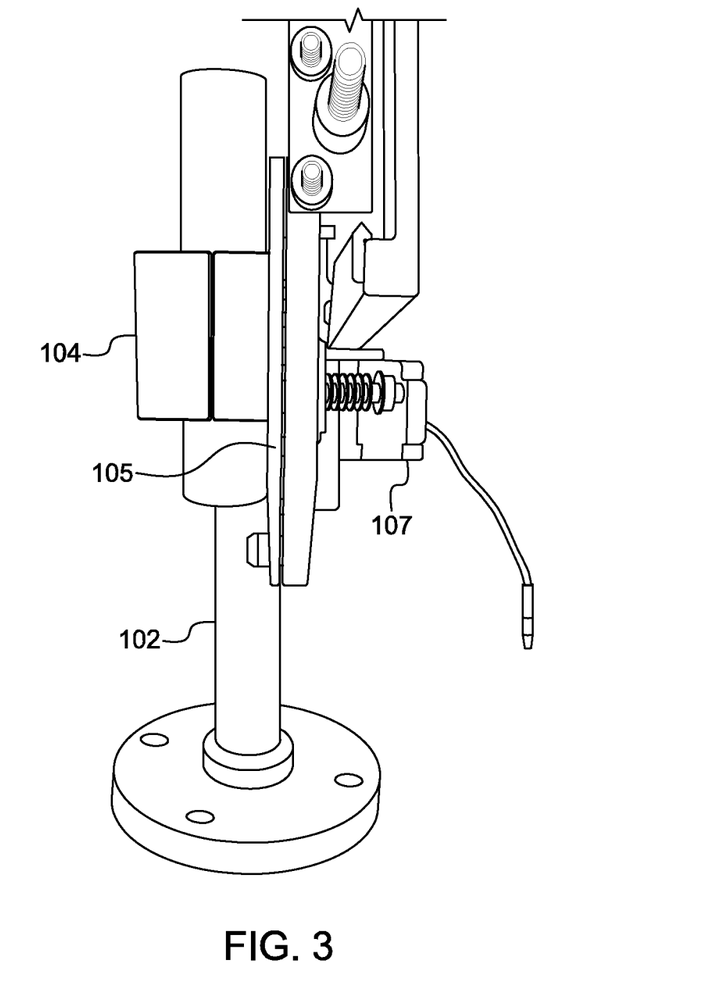
FIG. 3 is another view showing more detail of the structure of the arc welder of FIG. 1.
Figure 4:
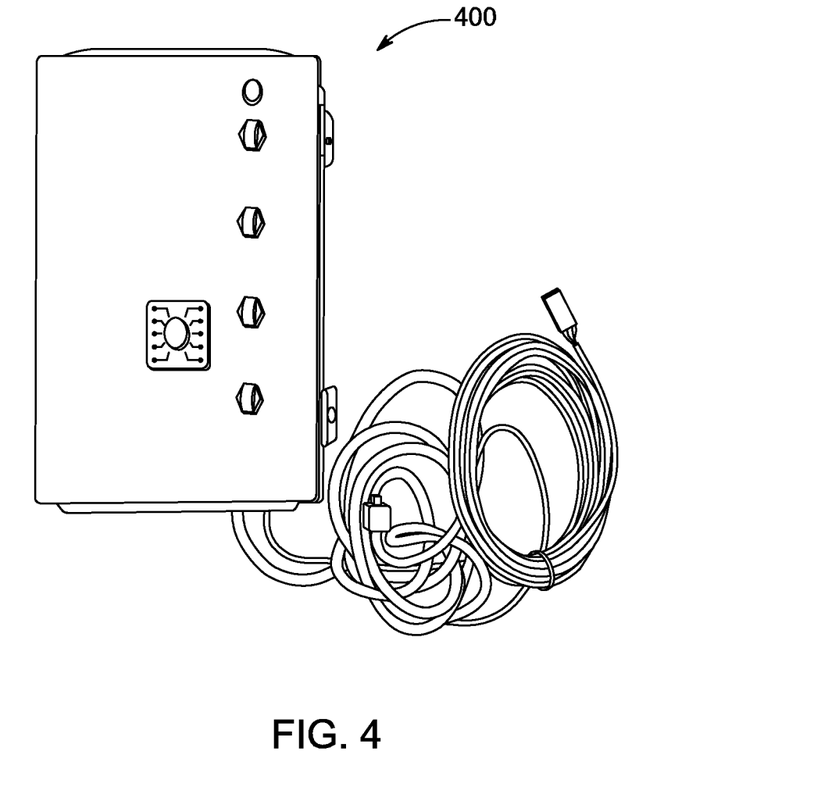
FIG. 4 is a view showing a controller of the arc welder of FIG. 1.

The preferred embodiment of the welding torch 100, shown in FIGS. 1-3, performs oscillation of the torch head 106 while moving the torch head along the circular weld path, under control of signals generated by a controller 400 (FIG. 4). As described below, the operator of the welding torch is preferably provided with control over the amplitude of the oscillation (how far the torch moves to each side of the weld path), how fast it moves back and forth, and how long it remains at each turning point of the oscillation (dwell time).

As shown in FIGS. 5-7, a torch welder for making circular welds (such as are needed to secure a fire-prevention sprinkler or other fixture to a pipe or the like) has a frame (shown in the background of FIG. 5), supporting a vertical cylindrical shaft at the bottom of which are mounted a set of concentric discs of different diameters, the smallest at the bottom and the widest at the top. These discs serve to accommodate fixtures of different bores. This structure serves to support the articles being welded.

The cylindrical shaft is received in a bore in a block that supports a horizontal arm (mounted at the back of the block in FIG. 5). At one end the arm supports a mount for the torch head, and the arm can be rotated about the axis of the articles being welded to form the desired weld, and thus serves as a rotatable support for the torch head. The arm is provided with a threaded shaft that can be made to rotate, to move the arm to the right or left (referring to the directions as seen in FIG. 5), to adjust the distance of the torch head from the axis of the cylindrical shaft.

The mount is structured as a plate to which is bolted a second, smaller plate that carries the torch head. Flexible conduits are provided as shown to supply the torch head with electric current and gas. As can be seen in FIGS. 5-7, the welding torch has the torch head mounted so that it is held near the work piece, and at an angle to the work piece (the pitch).

To make a weld, the two pieces to be welded are secured in place, with the axis of the base of the fixture centered, that is, properly aligned with the axis of the discs provided at the bottom of the shaft. The left-right location of the mount on the arm determines the radius of the circular weld path, and the torch is rotated about the axis of the central cylindrical shaft by moving the arm around that axis.

In this torch, if it were not equipped with the additional structure shown in FIGS. 1-4, the pitch (angle) of the torch head relative to the weld path could be manually adjusted by the operator in an effort to obtain the best weld, but could not be changed or controlled remotely, nor would such structure be able to perform oscillation. A manual adjustment could be made by loosening a bolt that holds the two plates together (visible at lower left corner in FIG. 5), changing the pitch as desired, and re-tightening the bolt.

The welding torch oscillator structure shown in FIGS. 1-3 also uses two plates (101 and 104) as the mount for the torch, but in contrast to the structure shown in FIGS. 5-7, those two plates are rotatable or pivotable relative to each other, even when the torch is in operation. That is, they are not secured together immovably, but instead the first plate 101 (the smaller one in the figures) is mounted on a shaft 102 and is pivotable about the shaft (the shaft is visible at the lower left corner of the mount plates in FIG. 1).

To control the pivoting of the front (smaller) mount plate 105, a motor 107 is provided, mounted on the side of the rear (larger) mount plate 103, and is connected to the front mount plate by a threaded rod 108, which is arranged for movement along its own length. The motor is operated to cause the rod to extend and retract, as needed, to rotate the torch head clockwise or counterclockwise, respectively, about the pivot.

The motor may be arranged to drive the rod by means of various types of linkages, and various kinds of motor can be used without departing from the spirit of the invention. It is especially preferred, however, that a stepper motor is used. The characteristics and control of stepper motors are well understood, and it is not necessary to review them here. Accordingly, the following describes what the torch head is controlled to do by means of the motor and linkage (the rod, etc.), and not the exact circuitry or programming, or both, by means of which that control is performed.

To produce the desired oscillation of the torch head during welding, the head is controlled so that during welding, as the torch head is rotated about the central cylindrical shaft, the motor is controlled to reciprocate the rod back and forth, pivoting the torch head about the lower left corner of the mount plates, clockwise and counterclockwise, in alternation. This causes the torch head to heat the metal to each side of the weld path, producing a wider bead and a better weld. The controller may provide the operator with the ability to select how far to each side the torch head oscillates, and the number of oscillations performed in making the weld along the entire length of the weld path. The controller may be constructed to control the number of oscillations in terms of, for example, oscillations to be made per unit time, or oscillations per degree of rotation about the central shaft, or oscillations per linear distance moved by the head along the weld path, or in any other fashion deemed suitable. It is also within the scope of the invention to provide the operator with the ability to select the speed with which the pivoting is performed; thus, if the torch head is to oscillate through an angle of x° to either side of the center of the weld path, the operator can control the speed with which it moves through that angle. Again, the controller preferably enables the operator to control whether and how long the torch head pauses at the ends of its oscillations. (It is also within the broad scope of the invention for the controller to have additional capabilities, such as enabling the operator to cause the torch head to pause in its movement at other points along its path, or enabling the operator to control the rate of movement of the torch head in more complex fashions.)

Even if oscillation is not used for all welds, the present welding torch oscillator provides the operator with the ability to adjust the angle of the torch head with great precision using the motor and the controller, and with great ease. In addition, since the controller may be provided remote from the welding torch itself, the operator can make this adjustment remotely, which cannot be done with a conventional structure.

It is within the scope of the invention to use the present welding torch oscillator with all or fewer than all of the foregoing types of control. It will be appreciated that this welding torch oscillator provides the welder with the ability to form a precise and high-quality weld with great consistency, and to customize the operation of the torch to accommodate work pieces of various dimensions and metals.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A welding machine for performing a circular weld, comprising:
a support structure to support a work piece to be welded at a first position;
a rotatable support rotatable around a first axis to move a torch head along a weld path around a circumference of the work piece supported by said support structure;
a mount for a torch head, said mount being supported on said rotatable support to be rotated around the first axis, and at least a portion of said mount being pivotable relative to said rotatable support, the pivoting being about a second axis;
a motor arranged to be rotated around the first axis by said rotatable support, said motor being connected to said portion of said mount by a threaded rod and being arranged to pivot said portion of said mount about the second axis to move the torch head across to the weld path; and
a controller connected to control said motor.

2. A welding machine according to claim 1, wherein said controller causes said motor to make the torch head oscillate back and forth across the weld path while said rotatable support rotates the torch head along the weld path.

3. A welding machine according to claim 2, wherein said controller sets one or more of amplitude of the oscillation of the torch head, speed of the oscillation, and dwell time of the torch head between successive oscillations.

4. A welding machine according to claim 1, wherein said controller causes said motor to move the torch head about the second axis to a particular weld angle and then holds the torch head at that weld angle while said rotatable support moves the torch head along the weld path.

5. A welding machine according to claim 1, wherein said motor is a stepper motor.

6. A welding machine according to claim 1, wherein said mount comprises first and second plates and a shaft passing through both said plates, said first plate being said portion that is pivotable about the second axis, and said second plate being fixed to said rotatable support, said first plate being pivotable about said shaft with said second plate remaining stationary relative to said rotatable support.

7. A welding machine according to claim 1, further comprising a linkage connecting said motor to said portion of said mount.

8. A welding machine according to claim 7, wherein said motor is a stepper motor and wherein said linkage comprises the threaded rod connected to said stepper motor and to said portion of said mount along a line spaced from the second axis.

\* \* \* \* \*